May 23, 1967  G. M. GROVER ETAL  3,321,646
THERMOELECTRIC CELL AND REACTOR
Original Filed June 18, 1959  8 Sheets-Sheet 1

WITNESSES:
Roy H. Smith, Jr.
Victor H. Laslo.

INVENTOR.
George M. Grover  Robert W. Pidd
BY  Ernest W. Salmi

May 23, 1967 G. M. GROVER ET AL 3,321,646
THERMOELECTRIC CELL AND REACTOR
Original Filed June 18, 1959 8 Sheets-Sheet

Fig. 8

WITNESSES:
Roy H. Smith, Jr.
Victor H. Laslo.

INVENTOR.
George M. Grover, Robert W. Pidd
Ernest W. Salmi
BY

Fig. 9

United States Patent Office 3,321,646
Patented May 23, 1967

3,321,646
THERMOELECTRIC CELL AND REACTOR
George M. Grover, Los Alamos, N. Mex., Robert W. Pidd, La Jolla, Calif., and Ernest W. Salmi, Los Alamos, N. Mex., assignors to the United States of America as represented by the United States Atomic Energy Commission
Continuation of application Ser. No. 821,339, June 18, 1959. This application Dec. 27, 1963, Ser. No. 337,967
38 Claims. (Cl. 310—4)

The present application is a continuation of an application filed by the present inventors on June 18, 1959, S.N. 821,339, now abandoned. That application was a continuation-in-part of an application filed by the present inventors on Mar. 3, 1959, S.N. 796,991, and now abandoned, the latter in turn being an undiminished continuation-in-part of an application filed on Oct. 1, 1958, S.N. 764,731, and now abandoned.

An object of the present invention is to provide a thermionic emitter electrode capable of continuous operation at high temperatures to provide electrical currents far exceeding those of any prior art emitter.

It is also an object of the present invention to provide means for converting the energy released in nuclear fission directly to electrical energy by including fissionable nuclei as a part of the emitter electrode in a thermoelectric cell containing a collector electrode and a low resistance plasma of an easily ionizable gas, and utilizing such fission energy to heat such emitter electrode to a high temperature. By extension, the present invention includes a fission reactor in which all of the fissionable material is incorporated in such emitter electrodes, a battery of such cells being assembled to provide a critical assembly and the outputs of such cells being combined to provide a high electrical power output.

Every conducting medium may be characterized by its thermoelectric power, a quantity expressed in units of potential difference per degree temperature difference for a particular temperature difference from one part of the medium to another. In metals, the thermoelectric powers are of the order of one microvolt per degree centigrade. These low values are commonly attributed to the fact that the electron gas in a metal is degenerate, i.e., the electrons are virtually non-interacting. In non-degenerate media, such as the electron clouds in a vacuum, in a plasma, in a semiconductor or an electrolyte, the characteristic value of the thermoelectric power is about 1000 times as great, or more nearly a millivolt per degree centigrade.

However, in considering the possibilities of exploiting these non-degenerate media, semiconductors do not appear to be suitable for thermoelectric cells because of their temperature sensitivities and their extremely delicate compositions. At the high operating temperatures of the present invention (1500–3000° C.), semiconductors lose their room temperature stability and behave in an erratic manner. The delicate compositions which give them their unusual properties, including very small amounts of impurities, would be easily upset by interaction with high level radiation fluxes, such as the neutron and gamma-ray fluxes of a fission reactor.

It has also been found that both vacua and semiconductors have quite high internal impedances in comparison with those of the plasmas utilized in the various embodiments of the present invention. For instance, when a vacuum diode is operated without an applied voltage, but with one plate at a considerably higher temperature than the other, a current of the order of one microampere per square centimeter of emitting surface will flow through an external resistor connected between the two plates for an electrode spacing of the order of one centimeter. This type of thermoelectric conversion depends on electron emission from the heated surface and electron absorption on the colder surface, and the current flow therein is limited by the space charge created by the electron cloud in the interelectrode space.

It has been found that the addition of a very small amount of an easily ionizable gas such as cesium vapor in the diode envelope changes its characteristics in a little effect on the EMF developed between the electrodes, but the impedance of the diode is lower by many orders of magnitude for the same geometry and for the same conditions of temperature and external resistance. The net result is a many fold increase in current flow, of the order of $10^6$, and a corresponding increase in the power delivered to the external load.

Irving Langmuir, K. H. Kingdon and others investigated some of the effects of a cesium plasma in a diode in the 1920's and 1930's and realized that such a plasma, like that of many gases, is very effective in avoiding the space charge effect of a vacuum diode. They also found that a low pressure cesium vapor enhances the current emission of certain thermionic cathode materials with the latter at a temperature not exceeding about 1000° K., but apparently they did not realize that such properties could be exploited to make such a diode useful as a source of electrical power, i.e., that high output currents could be obtained without the use of an external voltage source. They were preoccupied with the various phenomena observed at the emitter surface and with the positive ion currents obtained between a tungsten emitter and a surrounding collector electrode with the tungsten above a certain critical temperature (1150–1200° K.), a cesium vapor at essentially room temperature and a negative voltage applied to the collector, pointing out that such a device so operated is highly useful and accurate in measuring the vapor pressure of a gas. See, for example, Science, 57, 58 (1923) and Phys. Rev., 51, 753 (1937).

One of the outstanding characteristics of such an ionized vapor, or plasma, is its disorder, or randomness of direction of its constituent particles. Collisions with neutrons or other radiations will have little effect other than to increase the average particle energy and degree of ionization, effects which are wholly salutary. In addition, the easily ionized materials suitable for such plasmas have insignificant macroscopic absorption cross sections for neutrons because of the low plasma density, all of which make thermoelectric cells utilizing such vapors eminently suitable for use in extracting the thermal energy liberated in a nuclear fission reactor.

The present invention and the results produced thereby can be more clearly understood by reference to the attached drawings, hereby incorporated herein by reference, in which.

Figures 1, 3:
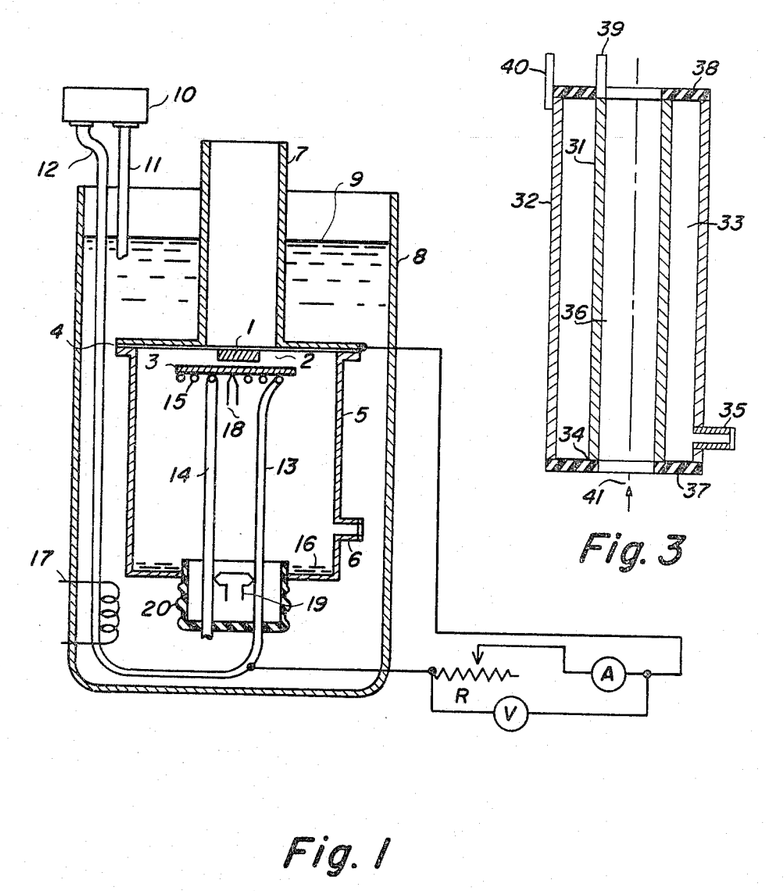
FIGURE 1 is an elevation cross section of an embodiment of a basic thermionic generator utilizing flat plate geometry.
FIGURE 3 is an embodiment of a basic thermionic generator utilizing concentric cylinder geometry.

In the embodiment of FIGURE 1 described by George M. Grover (U.S. Patent applications S.N. 249,962 filed January 7, 1963), the principal elements are the heated plate 1, hereinafter referred to as the emitter, the vapor 2 of an easily ionizable gas, and the cold plate 3, hereinafter referred to as the collector. Collector 3 is mounted within a gastight container 5 having a filling and pump-out lead 6 connected thereto and sealed at its open end by closure 4. Emitter 1 is mounted on the inside of closure 4, which is preferably metallic and of small thickness for good transmission of heat. Heat is supplied to closure 4 through means generally indicated as a tubular container 7 mounted thereon.

The entire assembly of gastight container 5 and heat supplying container 7 is mounted within a vessel 8 suitable for containing a hot insulating fluid 9, e.g., a silicone oil. A portion of this oil is continuously circulated by pump 10 through pipes 11, 12, 13 and 14 to the coil 15 on the underside of collector 3 to conduct away the thermal energy of the latter received by radiation from the emitter 1.

In the arrangement illustrated, parts 7, 4 and 5 are metallic for convenience in making connections to the external resistor R. As pictured, resistor R is connected between the emitter 1 and the collector 3 through the ammeter A, voltmeter V being used to measure the voltage developed across the resistor R. The emitter 1 is approximately 2 square centimeters in area and is spaced about 1 centimeter from the collector 3. Also shown are the thermocouple 18, used to measure the temperature of collector 3, and differential thermocouple 19, used to measure the temperature difference of the coil used to cool collector 3. Knowing this drop and the rate of flow, the heat extracted from collector 3 can be calculated, and from this and the known input to emitter 1, the efficiency of the device can be determined. Insulating bushing 20 is used for electrical separation of container 5 and coolant flow lines 13 and 14.

In preparing the cell for operation, the liquid form 16 of an easily ionized vapor is introduced through lead 6 under an oxygen-free, water-free, atmosphere. The container 5 is then evacuated to a hard vacuum ($10^{-5}$ millimeter Hg) and is permanently sealed. The liquid 16 is then partially vaporized by heating the bath liquid to the appropriate temperature for the cesium vapor used. To obtain the results shown in FIGURE 2, vapor pressures of $10^{-6}$ mm. Hg to 1 mm. Hg can be obtained by thermostatically controlling the temperature of the silicone oil bath at temperatures up to 300° C. through heater 17. Oxygen and water must be rigorously excluded because of their great affinity for cesium and the other alkali metals, which may be substituted for cesium. While minor amounts of inert gases such as argon may be tolerated, any such gas has its own impedance as a cell element, an impedance which acts in series with that of the cesium to depress the current flowing in its absence.

Figure 2:
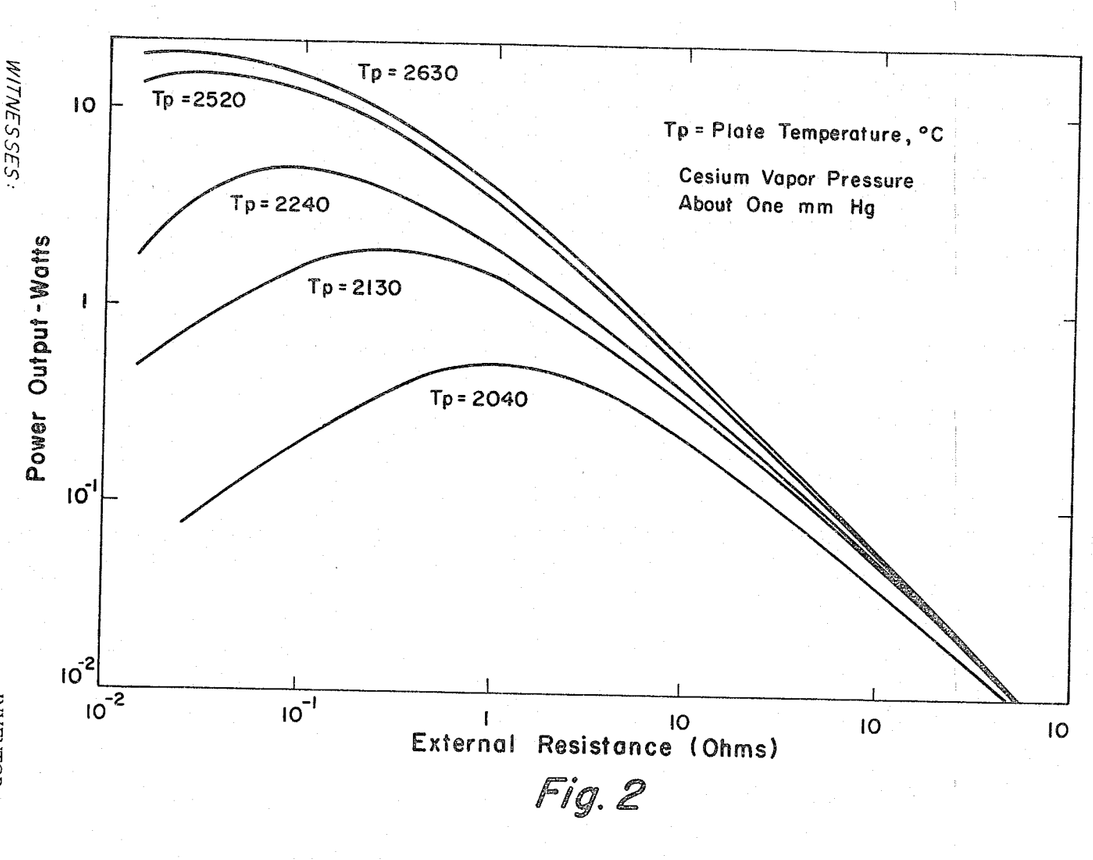
FIGURE 2 is a graph of the power output obtained with the FIGURE 1 embodiment as a function of the external resistance for various temperatures of the heated plate.

The results shown in FIGURE 2 indicate those obtained with a bath temperature of 250° C., under which conditions the collector temperature was about 300° C. They also indicate a maximum power output of about 20 watts, or about 10 watts per square centimeter of emitter surface. The maximum short circuit current observed was 40 amperes.

No specific means for heating emitter 1 are shown in FIGURE 1, as such means may assume a wide variety of forms. Hot flue gases may be utilized, heat liberated by chemical combustion within container 7 may be employed, or according to this invention, energetic particles such as alpha particles or fission products formed in a reactor may be directed to impinge on closure 4. Where more penetrating radiations such as beta particles, gamma-rays, X-rays or neutrons are to be absorbed, it will of course be necessary to add a suitable thickness of absorptive material above closure 4. To utilize the heat liberated in a fission reactor, the emitter may be made in the form of a massive element of a refractory material which includes the fission fuel, e.g., a rod of a solid solution of zirconium carbide and uranium-235 carbide, with a surrounding collector sleeve providing a gap for the easily ionized vapor, the subassembly forming a fuel cell. When a group of such cells is assembled in a neutronically critical configuration, the emitter will be self-heated in absorbing the kinetic energy of the fission products and the electrical outputs of the cells may be combined through suitable circuitry and utilized outside the reactor. Where necessary, the collector electrode temperature may be maintained at a low value by suitable gas cooling or other conventional cooling means.

Further, in accordance with the invention, the emitter electrode may be made self-heating by fabricating the same to consist in large part of intensely radioactive materials, in particular the intense alpha and beta emitting nuclides. Many such nuclides are available as fission reactor waste products which are easily convertible to refractory compounds such as oxides or carbides. Examples of such nuclides are Po, $P^{31}$ and $Sr^{90}$, and it should not be particularly difficult to obtain these materials in concentrated forms having radiation strengths of $10^4$ to $10^5$ curies. It can be shown from the work of the present inventors that such self-heated cells afford power outputs of the order of one kilowatt per pound of necessary structure.

The embodiment of FIGURE 1 illustrates the type of apparatus used in laboratory investigations of the basic thermionic generator described in S.N. 249,962 and as such contains many features unnecessary to commercially practical embodiments and is unnecessarily limiting in capacity. FIGURE 3 illustrates a practical embodiment of the basic thermoionic generator described in Grover S.N. 249,962 stripped to bare essentials and peculiarly adapted to utilize hot gases.

The embodiment of FIGURE 3 consists essentially of a pair of concentric conductive cylinders 31 and 32 held in place by insulating end rings 37 and 38 to define an annular chamber 33. Chamber 33 is exhausted though lead 35 and liquid 34 is admitted thereto by the same means. Emitter cylinder 31 is connected to an external electrical circuit through conductor 39, which collector cylinder 32 is thus connected through conductor 40. Emitter 31 is heated by the hot gas entering bore 36 at the lower end 41 for he direction of flow indicated by the arrow.

While bore 36 is illustrated as unrestricted from one end of the device to the other, it is apparent that baffles, etc., may be provided to restrict the flow for greater heat extraction. The various possible expedients for heat transfer from the hot gas to the emitter cylinder 31 are well known to heating engineers and hence need not be elaborated herein.

No means is provided for cooling or heating the collector electrode 32 of FIGURE 3 because it may be exposed to room temperatures or lower and thereby kept at the minimum necessary temperature by radiation from the emitter 31 and re-radiation to the outside. If necessary, the conventional, thermostatically controlled heating or cooling means may be added. Output efficiency appears to depend primarily on maximizing the temperature differential between the emitter and the collector, so all means to raise the former and keep the latter at the minimum necessary for vaporization of the conductive medium between electrodes will improve the operation of the device—unless increasing the temperature of the collector decreases the plasma resistance, as discussed below.

In preparing the FIGURE 3 embodiment for operation, the amount of cesium or other conducting medium necessary for the desired operating pressure, e.g., sodium, potassium or rubidium, may be added through lead 35 and the latter sealed off. When the temperature corresponding to such operating pressure is attained, all of the liquid will be vaporized and hence the particle density $n$ of the vapor will be fixed for this and all higher temperatures. Such condition may be desirable where it is expedient to limit the operating pressure, although the experimental work of the present inventors indicates that their thermoelectric cells are not particularly pressure sensitive. Experiments with fixed emitter temperatures showed a flat power output curve as the pressure was varied over the range 0.1–2.0 mm. Hg, with no indication of a tendency to rise or fall at either extreme. Greater pressures are difficult to obtain with the experimental embodiment of FIGURE 1, as the required bath temperatures make gasketing very difficult.

Flat power output for the various cesium pressures in the 0.1–2.0 mm. Hg range was obtained at a relatively large electrode spacing, 1 cm. or more, when a tantalum emitter was used. As indicated below in the discussion of the FIGURE 4 results, orderly increases in power and current with increasing pressure are observed with a tantalum emitter and an electrode spacing of ¼-inch (0.635 cm.). Similar increases are observed at all smaller spacings with a tantalum emitter and similar increases are observed with carbide emitters at small spacings from the collector, of the order of 0.1 cm. In such instances of pressure dependence, current and power output each varies approximately as the square root of the cesium pressure. It has also been observed that at quite large spacings, greater than one centimeter, cesium pressures greater than 1 mm. Hg cause a decrease in power output. This phenomenon is probably the result of insufficient ionization and/or an increase in the number of collisions between electrons and neutral gas particles.

It is to be noted that no separate means for ionizing the conducting vapor are provided in the illustrated embodiments, although they may be provided if desired. While the mechanisms of ionization and conduction are not fully understood and no theory has been developed which fully explains the behavior of the present inventors' thermoelectric cells, it seems apparent that the primary ionization mechanism at the onset is simply thermal. In other words, neutral atoms in the vicinity of the hot emitter become heated and dissociate simply because the valence electrons are too energic to remain bound. After the onset of conduction, $I^2R$ heating of the plasma probably accomplishes some further ionization. Other processes which may be involved are ionization by the photons streaming from the hot emitter and ionization by contact between neutral atoms and the hot emitter. When the work function of the emitter is greater than the ionization potential of the gas, it is known that essentially all of the gas atoms contacting the emitter are ionized; this effect falls off rapidly as the work function of the emitter descreases below the ionization potential of the gas. The intense emission of electrons by the emitter probably tends to cause recombination into neutrals in the neightborhood of the emitter.

Of course, it is necessary that the emitter and collector be fabricated of materials capable of withstanding the temperatures at which they are operated. The results indicated in FIGURE 2 were obtained with an emitter of tantalum, a copper collector and a cesium vapor. Equally good results are obtainable with cesium vapor and with both electrodes made of tantalum or tungsten under conditions otherwise the same. Any refractory and electrically conductive material, including alloys and such compounds as oxides and carbides, appears to be useable. The collector, of course, may have a considerably lower melting point than the emitter.

The present inventors have discovered that the emitter material is of considerable importance in increasing the current flow and thus the power delivered to the load under conditions otherwise identical. They have discovered that the carbides of uranium and zirconium, UC and ZrC, and solid solutions thereof, have properties which make them outstandingly superior thermionic emitters, especially when such carbides are used in the fused form, either as coatings on a base metal or as structural elements in themselves. Thus the power outputs indicated in FIGURE 2 and discussed above (obtained by the previously known embodiment of FIGURE 1) are increased many fold for conditions otherwise the same except that the purely tantalum emitter was replaced with an emitter consisting of tantalum coated with a fused polycarbide consisting of 80 atomic percent (a/o) zirconium carbide (ZrC) and 20 a/o uranium carbide to a thickness of $\frac{1}{32}$-inch, prepared in a manner more fully detailed below. This emitter and the others indicated in FIGURE 4 were tested in the apparatus of FIGURE 1 with no external resistance other than that of the connecting cables, with a cesium pressure of 0.5 mm. Hg, and with a 0.635 cm. gap between electrodes. The temperature of the emitter was varied to yield the short circuit current vs. temperature characteristic indicated in FIGURE 4, together with similar characteristics obtained from identical tests with a tantalum emitter and a number of cesium pressures and also with a tantalum emitter coated with only zirconium carbide. Also indicated in FIGURE 4 by the dashed curves are saturated emission currents for these emitter materials in a vacuum of about $10^{-6}$ mm. Hg for the same 0.635 cm. spacing. The values of short circuit current for the latter curves were determined experimentally for currents up to about 1 ampere and extrapolated thereafter.

Figure 4:
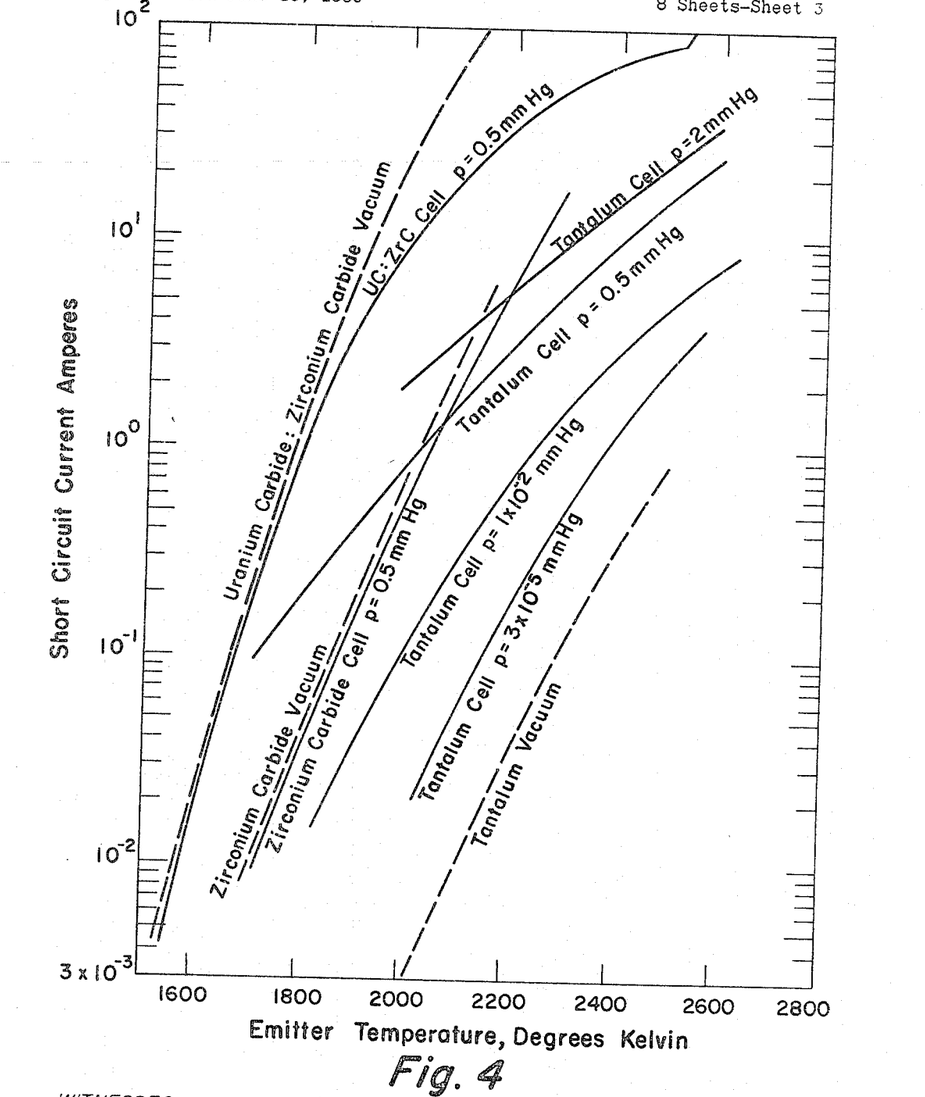
FIGURE 4 depicts short circuit current-emitter temperature characteristics for the FIGURE 1 embodiment utilizing various emitter materials and also includes saturated emission currents for such materials in vacuo, FIGURE 5 contains zero field saturated emission current curves for uranium carbide and zirconium carbide emitters.

FIGURE 4 illustrates the tremendous advantages possessed by the embodiment of this invention over those of the basic thermionic generator as described by George M. Grover, U.S. application S.N. 249,962. The basic thermionic generator concept is illustrated at FIGURE 1 and 3 of the present application. As can be seen from FIGURE 4, the currents obtainable with the carbide emitter are considerably larger than with a tantalum emitter. Thus the largest short circuit current obtained with the tantalum emitter was 40 amperes at a temperature of 2630° K., while at the same temperature a short circuit current of 124 amperes was obtained with the carbide emitter. The corresponding current densities are 20 amperes per cm.$^2$ and 62 amperes per cm.$^2$ of emitter surface. Note that the largest current obtained with the tantalum emitter was at the highest cesium pressure reported, 2 mm. Hg. Subsequent investigations of cesium pressures as high as 6 mm. Hg. indicate that still higher currents and power outputs are obtained under conditions otherwise the same. As can be seen from the group of curves for tantalum currents at various pressures, the electron emission property of this metal exhibits a systematic increase for increasing cesium pressure, the current (and power output) varying aproximately as the square root of the cesium pressure. A similar pressure dependence was exhibited by the carbide emitter at electrode spacings of the order of 0.1 cm. The same dependence may exist for carbide emitters and somewhat greater electrode spacings, but the experimental work thus far does not allow of any definite statement.

The carbide emission curves of FIGURE 4 for the cases where the emitter is used with a cesium plasma deviate to the right from the corresponding use in a vacuum. This indicates that such currents are plasma limited, a condition somewhat analogous to that of a space charge limited current. In the case of metallic emitters, the benefit of the plasma is not fully exploited because of the electron emission limit of the metal, while with the carbide emitters, the larger electron emissions permit a fuller utilization of the benefits inherent in the plasma. Indeed, there are some experimental points at which maximum utilization obtains and further increases in current must await decreases in plasma impedance, e.g., the aforementioned plasma limited regions of the current-temperature characteristics of the carbide emitters of FIGURE 4.

The above indicated superior electron emission characteristics of the carbides also led the present inventors to the conclusion that such materials might be used to good advantage in ordinary vacuum tubes and gas filled tubes employing thermionic cathodes. Accordingly, emitters were prepared coated with uranium carbide, zirconium carbide, and a solid solution consisting of 80 atomic percent ZrC and 20 atomic percent UC. Emitters of such materials were prepared for evaluation by arc melting the carbides under an argon atmosphere and allowing them to fuse on ⅝-inch diameter by ⅛-inch thick tantalum disks in a ½₂-inch coating thickness. This technique also required the preliminary formation of a coating of tantalum carbide on the tantalum base by outgassing the tantalum surface at 2200° C. in vacuum and heating the surface in contact with outgassed graphite powder, in a vacuum or inert atmosphere, at 2000 to 2200° C. for a period of about 15 minutes, as indicated in U.S. Patent No. 3,020,632 to Krikorian et al. Tantalum was selected for the backing because it is quite stable at high temperatures, but other conductive materials having high temperature stability can be used in its stead, e.g., tungsten. It is also possible to use the UC-ZrC polycarbide without a backing, as in the form of rods.

Each carbide was in itself prepared previously by arc heating the purified elements together in a previously "gettered" argon atmosphere. The polycarbide solid solutions were prepared both by hot pressing of the two carbides in powder form (—140 mesh) with 5 weight percent cobalt (—325 mesh) in graphite dies at 3000 p.s.i. and 1900° C., later distilling out the cobalt at 2000° C. in vacuo, and by inductively heating the blended carbide powders with no cobalt at 2000° C. for four hours in a graphite crucible. The latter technique resulted in a sintered rod which could be handled without breakage. The carbides had a silvery, dense, metallic surface, exhibiting no voids but having macroscopic crystalline patterns.

The electron emission characteristics of the various carbides were then tested in diode valves, using the coated plates as prepared above as cathodes. In each diode the cathode also served as a closure, the metal side facing outward and being heated by electron bombardment from an electron gun. Opposite the inwardly facing carbide surface and spaced therefrom at 0.635 cm. was a metallic disk collector or plate electrode of the same diameter as the cathode and a surrounding coplanar guard electrode to provide a uniform electric field for electron acceleration. Both electrodes were mounted in an envelope evacuated to $10^{-6}$ mm. Hg. The guard ring was grounded directly and the collector was grounded through an ammeter. The potential of the emitter was varied with respect to the grounded electrodes up to $-3$ kilovolts to obtain saturated emission currents and to obtain the Shottky correction to the zero-field currents. All currents discussed below are thus corrected by extrapolating a plot of log $i$ vs. $V^{1/2}$ to zero volts, yielding the zero field saturated current density $i_0$.

Figure 5:
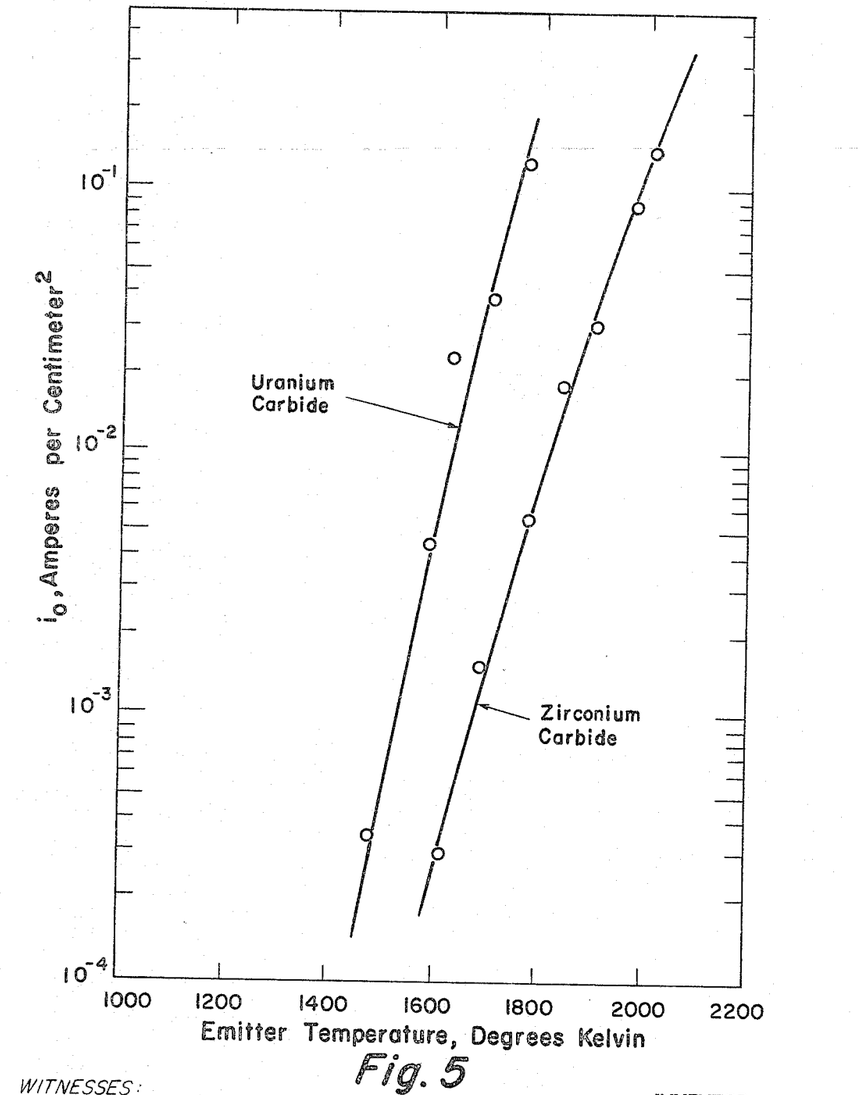
Figure 6:
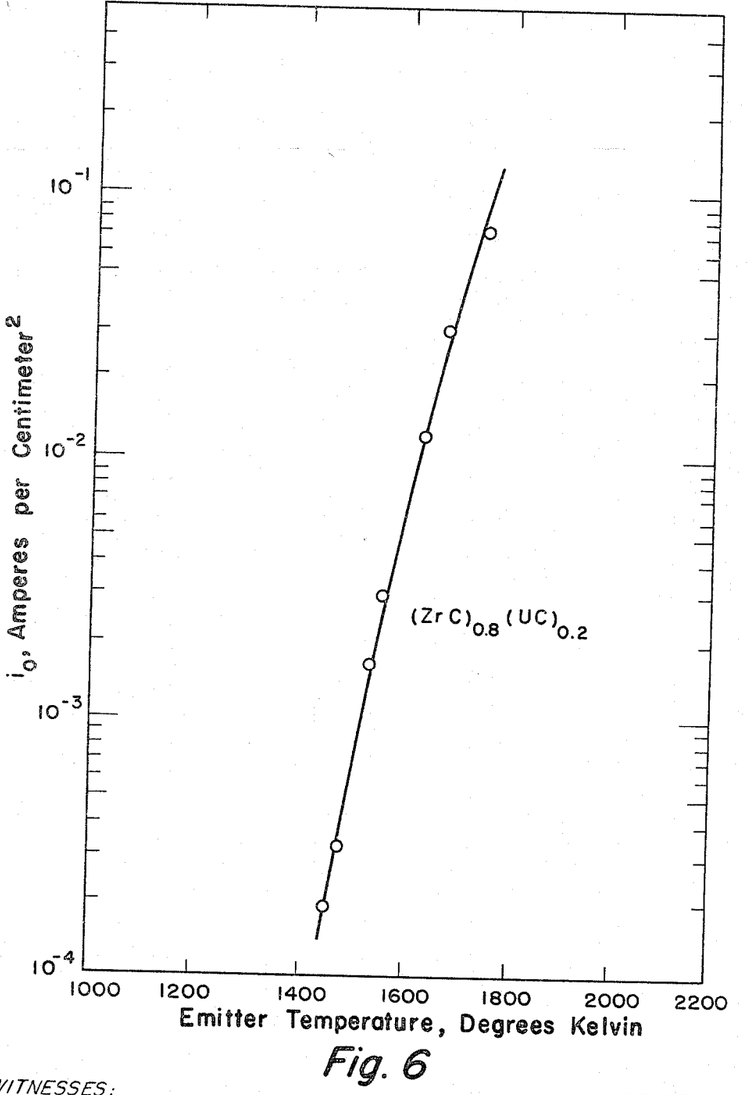
FIGURE 6 is a similar curve for an emitter of 80 atomic percent zirconium carbide and 20 atomic percent uranium carbide.

The results thus obtained are presented in FIGURES 5 and 6 of the drawings, FIGURE 5 showing the separate characteristics of UC and ZrC, while FIGURE 6 presents the characteristic of a solid solution of the two carbides consisting of 80 atomic percent (a/o) ZrC and 20 a/o UC. Note that the latter characteristic is essentially identical with that of UC, the polycarbide having the higher electron emissivity of the UC at any given temperature and the greater ductility of the ZrC. UC alone tends to crack on repeated thermal cycling, but no such behavior is manifested by the ZrC or polycarbides employed, even when rapidly and repeatedly cycled from room temperature to 2400° C. and back.

The data disclosed in FIGURES 5 and 6 can be fitted to the Richardson emission curve $$i_0 = AT^2 \exp\left(-\frac{q_e\phi}{kT}\right)$$

where $T$ = absolute temperature of emitter surface, degrees Kelvin
$q_e$ = electron charge, coulombs
$k$ = Boltzman constant, ergs/degree Kelvin
$\phi$ = work function of emitter surface at temperature T, volts
$A$ = a semi-empirical constant, $$\frac{\text{amperes}}{\text{cm.}^2 - °K^2}$$

While the work function $\phi$ has not been measured directly over the temperature range involved, an assumption that it is not temperature dependent leads to the following empirical fit of all the data in FIGURES 4, 5 and 6:

| Emitter | A, amperes / cm.²-°K.² | $\phi$, volts |
| --- | --- | --- |
| ZrC | 134 | 3.8 |
| UC | 730,000 | 4.57 |
| (ZrC) – (UC) 0.8     0.2 | 66,000 | 4.3 |

To compare the values of $i_0$ in FIGURES 5 and 6 with those of a clean metal, note, e.g., that the polycarbide current density is 0.16 amp./cm.² at 1800° C. The corresponding current density of tantalum at this temperature is $10^{-5}$ amp./cm.², indicated a 1600-fold increase in going to the carbide.

The UC and UC-ZrC emitters discussed above also have other properties which make them peculiarly suitable as thermionic coatings or structures. No activation schedule, such as the "flashing" of thoriated tungsten or the gradual increase in current of oxide coatings, is required, nor is it necessary to take special steps to clean the surface of the present carbide emitters prior to use. Exposure to ambient atmospheres has no effect even though lasting for days, and the present emitters may be re-used in vacuum systems without the delays necessary to reactivate the thermionic cathodes of the prior art. This particular advantage makes the present emitters ideal for use in apparatus which must be periodically opened for one reason or another, e.g., betatrons, cyclotrons and other charged particle accelerators.

The results obtained with the carbide emitters depicted in FIGURES 4, 5 and 6 are absolutely reproducible, i.e., there is no gradual loss of emissivity in repeated operation. Such results are also obtained without the emission lag peculiar to many of the good emitters of the prior art, in which several seconds may elapse between energizing the cathode heater and the appearance of maximum current.

Probably the most outstanding advantage of the carbide emitters herein disclosed is the ability to operate at much higher current densities and temperatures than the thermionic emitters of the prior art, especially the thoriated tungsten cathodes. The latter have an upper operating limit of about 1 ampere per square centimeter, whereas the emitters of the present invention have already been operated without ill effects at current densities as high as 60 amp./cm.$^2$, as indicated in FIGURE 4, and extrapolated values as high as 1000 amp./cm.$^2$ appears feasible. When a thoriated tungsten filament is operated above its limit, even momentarily, the thoria appears to boil off and the enhanced emission properties are completely lost until the filament is re-activated. Emission from the carbide materials, on the other hand, appear to be limited only by the temperature at which such material is structurally stable, about 2900° C. for the specific polycarbide disclosed. (UC melts at 2450° C., ZrC at 3500° C.)

The use of the carbides disclosed herein is not limited to the physical forms of coatings or inclusion in a metal, as are the oxide emitters of the prior art. This follows because such carbides approach the metals in both thermal and electrical conductivity, unlike the highly insulating and highly resistive oxides of the prior art.

While details of only a limited number of carbide compositions are disclosed herein, and only coatings on metallic bases and unitary carbide structures have been discussed, there are reasons to believe that many other compositions and combinations will yield comparable results. Thus when UC carbide was melted in close proximity to a highly incandescent tungsten filament in a vacuum diode, the electron emission from the filament was observed to increase by a factor of 3. A small amount of work with niobium carbide indicates that its electron emission characteristics may approach that of uranium carbide. Other carbides which may lie in the same range are those of thorium, protactinium, plutonium, neptunium, and americium. The other carbides of uranium are probably equally as good as the monocarbide dealt with. There is good reason to believe that many other proportions of UC and ZrC will produce comparable or better results, as their crystal structures are isomorphous and they appear to be completely miscible.

The current densities disclosed above for uranium carbide and uranium carbide diluted with zirconium carbide were obtained with UC prepared from the non-fissionable isotope $U^{238}$ (at least non-fissionable except by highly energetic neutrons). The emission characteristics do not depend on any of the nuclear cross sections of uranium, and the present invention is thus believed to be fundamental is exploiting the element in a manner which does not depend on its nuclear characteristics. However, the highly fissionable isotopes such as $U^{235}$ may be used without any immediate effects on emissivity, as the rate of electron emission does not depend on the composition of the nucleus.

If the UC in an emitter is made of uranium enriched in $U^{235}$ to provide a critical assembly, either in one cell or a number of cells disposed adjacent one another, the fission products may not be held in the emitter structure at the high temperature of the latter. Many of them are gases which could enter the plasma and gradually destroy its utility as a low resistance, non-degenerate electron medium.

Such behavior is in direct contrast to the activity taking place in a conventional heterogeneous fission reactor, especially those using solid uranium or plutonium fuel elements. In such elements the fission products remain in the fuel and there is no way of eliminating them except except by withdrawing the element and processing it to remove the fission products. The unfortunate aspect of such a situation is that the processing must be accomplished before any appreciable part of the fissionable element content has been used, as the economic time for processing is dictated by the rate of accumulation of fission product poisons, i.e., those which capture neutrons prodigally. In the comparable elements of the present invention, the high temperature fuel element emitters tend to cleanse themselves of fission products and need never be processed except when it is desirable to replenish the fissionable nuclide material. All that is necessary to preserve the good characteristics of the plasma is a continuous processing of the gas to remove the fission products therefrom. Such processing is much easier to accomplish with a mobile medium such as a gas than with a solid material.

Figure 8:
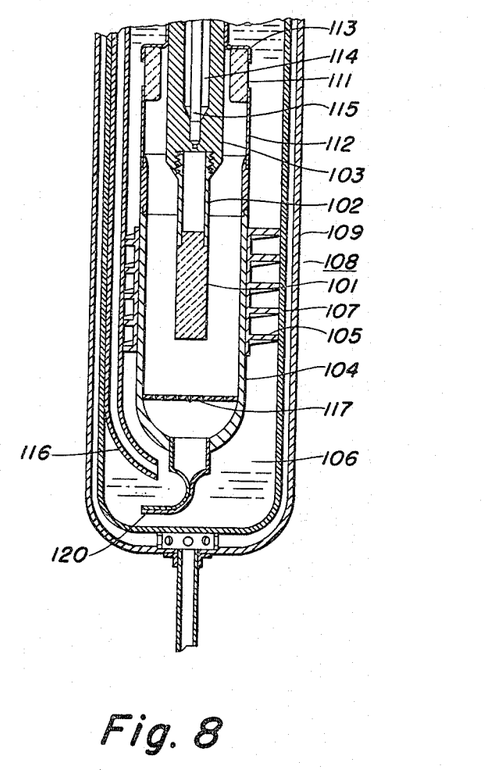
FIGURE 8 is a sectional view of a single thermoelectric cell assembled with a dewar flask for testing in a fission reactor, and FIGURE 9 are the open circuit voltage and short circuit currents of the FIGURE 8 embodiment as functions of the maximum power of the reactor in which the cell was tested.

To demonstrate the advantages of the thermoelectric cells of the present invention using carbide emitters with uranium enriched in the U–235 isotope, such a cell was prepared and tested in an operating nuclear fission reactor. FIGURE 8 is a longitudinal section of this cell, shown here in full scale. The cylindrical fuel pin 101 was fabricated by hot pressing equal weights of uranium carbide (UC) and zirconium carbide (ZrC) into a solid rod about ¼-inch in diameter, the fuel pin likewise being pressed onto the hollow tantalum support 102, this assembly then being sintered, machined to a final diameter of 0.71 cm. and threaded at the tantalum end. While no demarcation in fuel pin 101 is indicated in FIGURE 8, only the lower half contained uranium carbide in which the uranium was enriched with the $U^{235}$ isotope (94%), the upper half containing only natural uranium. This was done to insure a thermal gradient from the lower end of fuel pin 101 to the copper base 103 into which the tantalum support 102 was threaded. The lower half of fuel pin 101 thus had a circumferential area of 2.84 cm.$^2$, an end area of 0.39 cm.$^2$, a volume of 0.50 cm.$^3$, and a total mass of 4.5 grams, of which about 1 to 2 grams were $U^{235}$.

The balance of the thermoelectric cell of FIGURE 8 consisted of the cylindrical stainless steel collector 104, to which was affixed a spiral copper cooling fin 105, the latter serving both to dissipate heat received by the collector to inner wall 107 of metal dewar cylinder 108 and the circulating oil coolant 106 and to secure the fuel within the dewar. The radial gap between electrodes was about 0.7 cm. The cell proper was closed by an annular alumina insulator 111 and nickel flange members 112 and 113, flange 112 being sealingly secured to both the insulator 111 and the collector 104, and flange 113 to the emitter base 103 and to insulator 113. The central opening 114 extending from the top of emitter base 103 was provided to accommodate a thermocouple tube 115. Above the structure shown were a closure for the dewar flask, a long supporting tube for the entire structure, electrical leads secured to emitter base 103 and inner dewar wall 107, and an oil return lead.

These leads were connected to a remotely operated switch installed just above the cell, such switch having positions to measure open circuit voltage, short circuit current and maximum power output. Coolant oil 106 was supplied through oil lead 116 to control the temperature of collector 104 and the cesium pressure within the cell. Perforated cross member 117 served as a radiation shield for the cesium pool. Helium at atmospheric pressure was used between the inner wall 107 and the outer wall 109 of dewar flask 108 as a means of conducting gamma heat from inner wall 107. Use of the cell within such a dewar flask made it possible to immerse the assembly in the cool (37° C.) water of the reactor without affecting the temperatures within the cell. The electrical path from the collector was through both the spiral cooling fin 105 and a heavy strap (not shown) to inner dewar wall 107.

Prior to assembly, the cell was evacuated through lead 120, cesium was admitted through the same lead, and the lead was sealed off. The thermoelectric cell and dewar assembly were secured to the aforementioned long tube with the remotely controlled switch in place above the dewar, and the oil and instrumentation leads were extended through to the upper end of the tube. The entire assembly was then lowered into one of the central empty fuel element holes in the Los Alamos "Omega West" reactor, a heterogeneous water cooled and moderated materials testing type of reactor using solid enriched uranium fuel rods jacketed with aluminum. This particular reactor has an approved maximum power capacity of about 5 megawatts (thermal).

Figure 9:
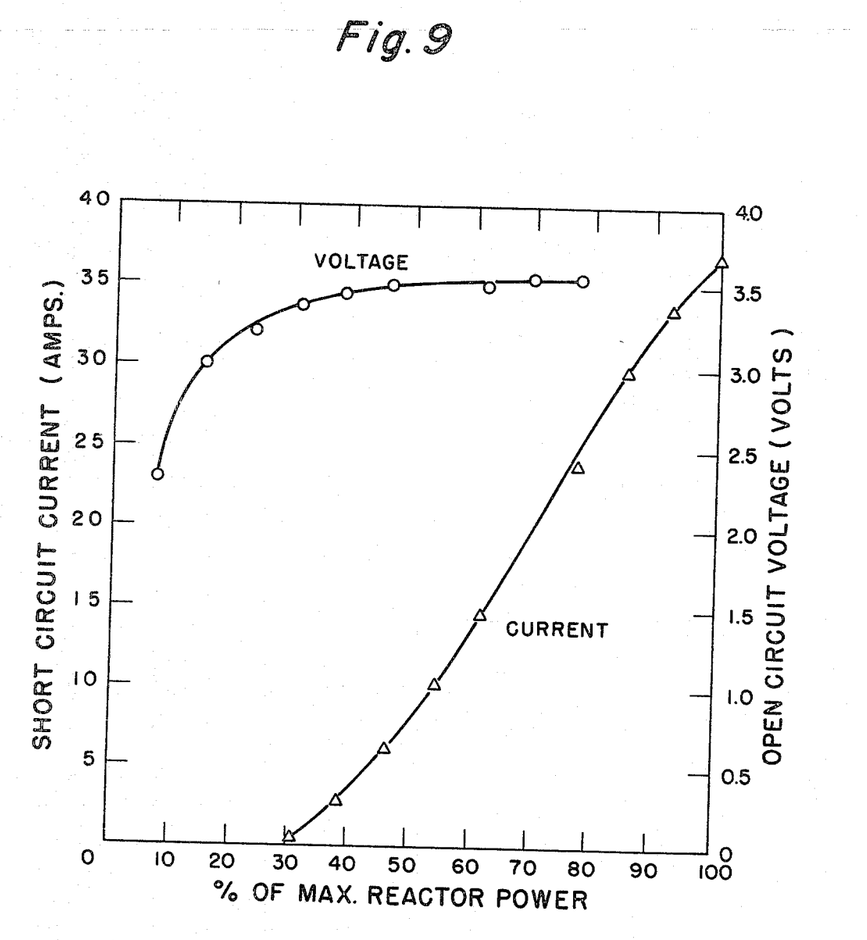

The reactor was brought up to maximum power by customary means (manipulation of control rods) in about half megawatt steps, and operated at such power for about five hours. Short circuit current was monitored continuously, and open circuit voltage was determined for fractions of maximum power and occasionally after reaching full power, yielding the results indicated in FIGURE 9. The open circuit voltage remained essentially constant during the five hour period, but the short circuit current dropped off about 20% from the 37-ampere value indicated during the first hour of operation, remaining at about 30 amperes thereafter. A malfunction of the switch in its third position prevented any measurement of maximum power output. During this period the average temperature of the coolant oil contacting the collector electrode was about 260° C., from which it is known that the cesium pressure in the cell was about 0.1 mm. Hg.

At the end of this first five hour period, the reactor was shut down for a weekend (~60 hr.) with the thermoelectric cell assembly in place. It was then brought up to maximum power and operated at this level for a second five-hour period. The open circuit voltage and short circuit current were the same as before the first shutdown and exhibited little variation during the second five hours of operation. Again maximum power output could not be measured because of the faculty switch. The power output on short circuit could not be calculated because the resistance of the external path was not known.

At the end of the second five hour period, the cell was still functioning as indicated, but it was decided that the cell should be removed for analysis. This analysis indicated that the fuel pin had been subject to an average thermal neutron flux of $10^{13}$ neutrons per cm.$^2$ per sec. and had experienced $6 \times 10^{17}$ fissions.

To determine the emitter temperature during the in-pile test and the maximum power output obtainable during such test, a cell of a similar geometry and the same spacing and cesium pressure was operated by heating the emitter electrically. By correlating the open circuit voltage and short circuit current data obtained with this cell as functions of temperature with the data obtained during the in-pile test, it is estimated that the emitter temperature during maximum reactor power operation was 2000° C. From this information and from the known power output of the electrically heated cell as a function of emitter temperature, the maximum electrical power output obtainable during the in-pile test would have been 30 watts.

The above results are significant for the following reason. They demonstrate that the thermoelectric cells of the present invention can be utilized to obtain electrical energy directly from the energy released in fission. It is noted that the high temperature of the emitter during the in-pile test could not have been achieved except by absorption by the emitter structure of the energy released by fission of its own fuel atoms, principally the kinetic energy of the fission fragments. It can therefore be seen that ionization of the easily ionized gas is caused principally by the kinetic energy of the fission fragments, directly or indirectly. Any energy released by fission in the adjacent reactor fuel rods has only a negligible effect, as the fission fragments produced therein could not have penetrated to the thermoelectric cell, and other energetic particles or radiations have at the most a negligible heating effect on the cell (most of the neutrons are moderated to thermal energies, alphas are stopped, most of the gammas pass on through, and betas are negligible).

Figure 7:
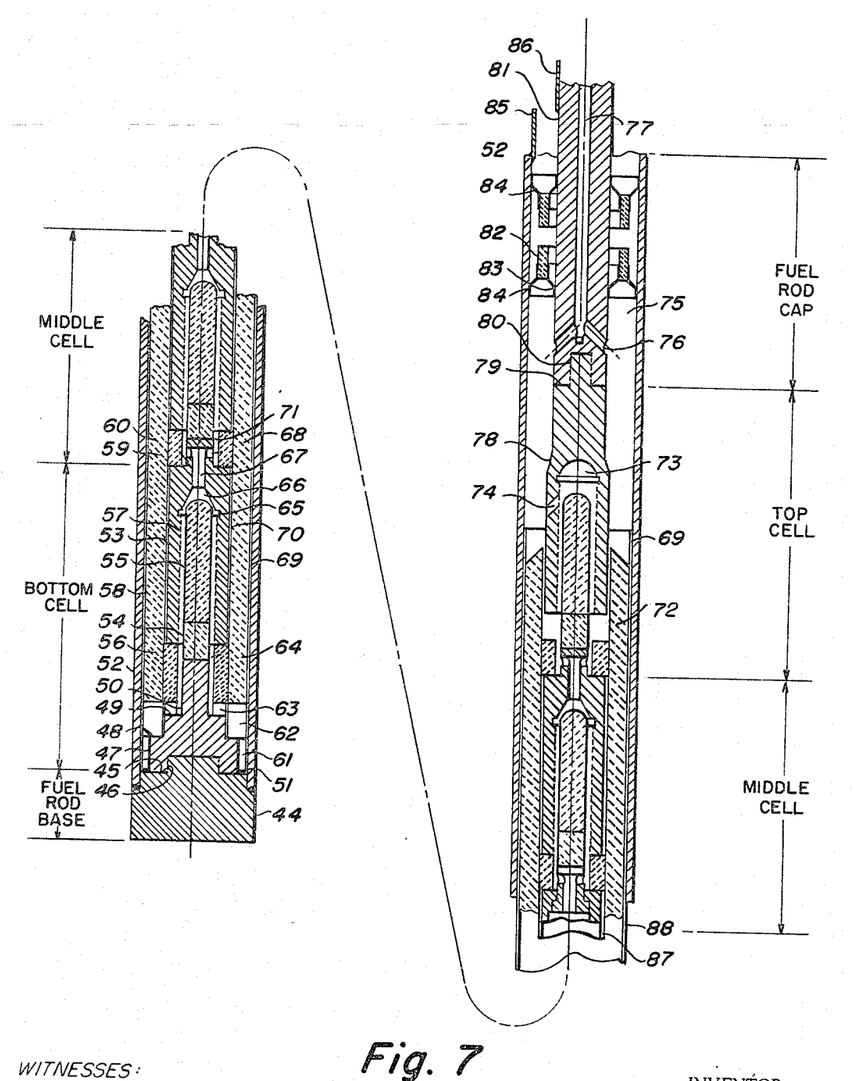
FIGURE 7 is a sectional view of a fission reactor fuel element consisting of a multiplicity of thermoelectric cells of the present invention.

FIGURE 7 illustrates a fuel rod composed of a multiplicity of the thermoelectric cells of the present invention disposed in voltage additive relationship. A suitable number of such rods may be disposed in a low temperature coolant such as room temperature water to form a critical assembly. This fuel rod consists of fuel rod base 44 and shell 52 welded thereto as a container, both, e.g., of aluminum and serving together as the electrical path from connector 85 at the top to the emitter electrode of the bottom cell. Inside the shell are the bottom cell, a plurality of middle cells, a top cell and the fuel rod cap, all such cells up to about the middle of the top cell being surrounded by a continuous insulating sleeve 58, the latter being of slightly smaller outside diameter than the bore of shell 52 to define the annular passage 69 for the return of condensed cesium from the top of the fuel rod to well 61. Threaded to reduced diameter portion 46 of base 44 is the base 47 of the first emitter electrode, e.g., of tantalum or zirconium. This base is butted tightly against shoulder 45 of fuel rod base 44 and has an outside diameter less than the inside diameter of shell 52 to provide annular gap 61, the latter serving as a well for liquid cesium 51. Insulating cylinder 58 rests against shoulder 48 of emitter base 47 and is provided with a number of radial slots 62 extending across the bottom as vapor passages. Surrounding emitter base 47 inside the bore of sleeve 58 is a second insulating sleeve 56, of smaller diameter than the first sleeve 58 and extending longitudinally only over a part of the emitter structure of the bottom cell. Insulating sleeve 56 has a smaller inside diameter than the diameter of the emitter base 47 to provide a gas passage and interelectrode gap 64 around the cylindrical, center mounted emitter structure and is also provided with a number of bottom radial slots 63 to provide gas passages between gas passages 62 and 64.

The balance of the emitter structure of the bottom cell consists of transition section 54, composed of ZrC, and fuel section 55, composed of a solid solution of ZrC and UC. Each of these sections is fused to the adjacent section or sections and has the same diameter as stud portion 50 of emitter base 47. Surrounding the emitter and spaced therefrom by the annular gap 64 is the cylindrical collector electrode 53 composed, e.g., of zirconium, tantalum, copper or stainless steel. Collector 53 butts against the top of insulating sleeve 56, is threaded or serrated on its inside surface 57 to provide a maximum surface and thus reduce the impedance of the cell, and extends into the first middle cell in a reduced diameter portion 60 to form the base of the emitter electrode of the first middle cell. It is to be noted that collector electrode 53 has a slightly smaller outside diameter than the inside diameter of insulating sleeve 58 to define a small annular passage 70 extending from the top of insulating sleeve 56 to the bottom of the corresponding insulating sleeve of the first middle cell. This gap permits ready assembly of the cell and furnishes the space required for expansion of collector 53. The threaded inside surface 57 of the collector electrode terminates in smooth surface 65 to provide thread relief. Thereafter, proceeding to the top of the collector, the central passage includes frusto-conical cavity 66, longitudinal center cavity 67, and radial passages 68, the latter terminating in annular passage 71 between the reduced portion 60 of the collector and the short insulating sleeve 59 of the first middle cell.

The division between cells as indicated in FIGURE 7 is somewhat arbitrary, as the collector electrode of each lower cell also serves as the emitter electrode of the adjacent upper cell, and the entire fuel rod is provided with a continuous vapor passage between successive cells. Except for the fact that the bottom cell is provided with a somewhat larger emitter base, each of the middle cells is essentially identical with the bottom cell, transition sections and active fuel sections of the emitter electrodes being identical, the collectors being identical and the gaps between paired electrodes being identical.

Proceeding to the top cell, the emitter structure and the short insulating sleeve thereof are identical with those of the middle cells. The differences lie in the fact that the central gas passage terminates in a blind end 73 and downwardly extending radial passages 74 are provided through collector 78, and insulating sleeve 58 terminates short of such radial passages 74. The purpose of these modifications is to provide a cold region surrounding the top of the top cell for the condensation of the cesium vapor and its return to the bottom of the rod through annular passage 69. In addition annular gap 72 is provided at the base of collector 78 for axial expansion of the array of cells.

Stud portion 80 of top collector 78 is threaded to metal rod 81 to complete the electrical circuit through connector 86. This rod 81 is provided with central passage 77 and downwardly extending radial passages 76 to the vapor space 75 between shell 52 and both rod 81 and collector 78, thereby providing means for vacuuming the fuel rod prior to operation and for continuous withdrawal of the vapors in space 75. Since most of the cesium will be condensed on the inside of shell 52, the bulk of any vapor withdrawn will consist of gaseous fission products, which may be withdrawn through 77 and disposed of outside the reactor.

The fuel rod is sealed at the top by annular insulating rings 82, e.g., of alumina, and by annular springs 83 and 84, the latter being welded to both the insulating rings 82 and aluminum shell 52. It has not been found feasible to employ the usual type of closure, e.g., a flat cap secured to shell 52 with a central passage and gasket to accommodate rod 51, as no gasketing material has been found which will withstand the radiation flux to which it is exposed in a fission reactor. Central rod 81 and shell 52 may be terminated as convenient for electrical connections.

To insure positive thermal contacts between collectors 53 and insulating sleeve 58, and also between insulating sleeve 58 and shell 52, multiple gaps 70 and single gap 69 are provided with corrugated beryllium-copper spacers, indicated in FIGURE 7 as 87 and 88, respectively, there being one spacer 87 for each gap 70. This type of element also allows of easy assembly and, in the gap 69, furnishes the necessary space for the flow of cesium to well 61.

BeO was chosen as the material for insulating sleeve 58 and insulating sleeves 56 because it is shock resistant and has the proper thermal conductivity. Since collector electrodes 53 will be operated at essentially 300° C. and the shell 52 will assume the approximately 0° C. temperature of the aqueous coolant, the BeO sleeve will contain essentially the full 300° C. gradient. Beryllia is also compatible nuclearly, as it has a low absorption cross section for neutrons of all energies, and its low atomic weight makes it a good moderator. Other suitable insulating materials such as $Al_2O_3$ may be substituted.

Because the electrical conductivity of the coolant is likely to be uncertain, the outside of shell 52 and fuel rod base 44, and 81, 86 and 85 should be provided with an insulating film such as an oxide of zirconium or aluminum, e.g., by applying a coating by flame deposition.

Cesium was selected for the above mentioned experiments both for the ease with which it may be volatilized and because it has the lowest known ionization potential of all elements, namely 3.88 volts. Other alkali metals such as K, Rb and Na may also be used, as they have low vapor pressures and low ionization potentials, but the fact that the latter are somewhat higher than the ionization potential of cesium means that a somewhat higher temperature is required for the same degree of ionization.

A particular advantage possessed by embodiments of the present invention is that there is no consumption of parts in the operation thereof, other than fissioning of the uranium content, if this is the method chosen for heat generation. The cesium vapor is not consumed, and the electrodes are of sturdy material, with no brittle coatings, and do not become subject to shock breakage by continuous use at elevated temperatures. The only thing consumed in operation is the heat extracted from the particular heat source used, heat which otherwise would be wasted but is converted into useful electrical energy by the methods and apparatus of the present invention.

As may be inferred from the above, the major impediment to large efficiencies of the present thermoelectric cells is the large amount of radiation from the emitter. While this radiation increases rapidly with temperature, the electrical power delivered to the load increases even more rapidly, so that efficiency is optimized at the maximum temperature at which the emitter is structurally stable. It can also be shown that for any particular plasma resistance, the power deliverable to an external load is maximized when its value equals that of the plasma resistance (treating both impedances as purely sensitive). A method of further reducing losses appears to lie in interposing a series of electrically "floating" radiation shields between emitter and collector to re-radiate back to the emitter. This is at best a fringe benefit, as such shields must be in the form of open mesh or grid construction to permit conduction through the plasma, thereby reducing the available radiation surface.

Embodiments of the type illustrated in FIGURE 1 have been operated with efficiencies as high as 13%, efficiency being defined as the ratio of the electrical power output to the sum of such output, the thermal energy incident on the collector electrode and the thermal energy lost by conduction from the emitter to the adjacent metal structure. Such efficiencies were obtained using the 2 cm.$^2$ tantalum emitter described above, a copper collector electrode spaced 0.1 cm. from the emitter, and a cesium vapor pressure of 2 mm. Hg. Efficiency was optimized at an emitter temperature of 2450° C., under which conditions the current drawn was 60 amperes, the power delivered to an external resistor (R of FIGURE 1) of 0.017 ohm was 60 watts, the measured radiant energy incident on the collector electrode was 300 watts, and the emitter conduction losses were calculated to be 100 watts.

For applications such as the extraction of heat from a high power level fission reactor, embodiments of the present invention are believed to represent a stride forward in that at least a part of the conventional coolant-turbine-generator equipment may be eliminated. The radiant heat in such applications is not thrown away, but is still available for external use. Optimization of design where such a reactor may be used to furnish both heat and electrical energy may well eliminate such conventional electrical power generation equipment in its entirety.

With the efficiencies of 13% for a tantalum emitter and with probably even greater efficiencies prevailing for the carbide emitters employing uranium carbide, it becomes possible to consider the plasma cells of the present invention as power sources for space vehicles. Thus the emitter may be heated by any number of the means mentioned above—using the emitter itself as the fissile fuel container, locating a critical assembly outside the plasma cell or cells and utilizing the fission energy to heat the emitter, or using solar energy or the energy released by radioactive nuclides as heat sources.

The electrical energy thus made available by the plasma cells can be used both to ionize and heat a propellant gas such as hydrogen or helium, and to energize coils to provide a magnetic field of high intensity. The ionized fuel will then be propelled through a nozzle of the vehicle by such magnetic fields and crossed electric fields to furnish the necessary thrust. The energy transferred to the magnetic field by the plasma cells will thus be continuously transferred to the propellant.

What is claimed is:

1. Means for converting one form of energy into electrical energy comprising, in combination, a first electrically conductive refractory material, a second electrically conductive material spaced from said first electrically conductive refractory material, closure means defining a gas chamber between said electrically conductive refractory materials and a partial filling of an alkali metal in said chamber, said first electrically conductive refractory material being at a temperature of not less than 1500° K. during operation and comprising at least one of the carbides selected from the class consisting of uranium, zirconium, niobium, thorium, protactinium, plutonium, neptunium, and americium.

2. The device of claim 1 in which said first electrically conducting refractory material includes about 80 mole percent zirconium carbide admixed with uranium carbide in the form of a fused solid solution.

3. The device of claim 1 in which said carbides are fused on a backing of a refractory metal.

4. A device for extracting energy, including electrical energy, from $U^{235}$, comprising in combination a critical assembly of fuel cells, each said fuel cell comprising a core consisting of an electrically conductive refractory combination of said $U^{235}$ with uranium carbide diluted with zirconium carbide, an electrically conductive shell surrounding said core, electrically insulated therefrom, and defining a gap therewith and a partial filling of an alkali metal vapor in said gap, said gap otherwise containing only a hard vacuum, means for connecting each said core and each said shell to external electrical circuitry, and cooling means for extracting the heat energy of said shells and maintaining said cells at about the minimum temperature required for vaporizing said alkali metal to a vapor particle density of $10^{12}$ to $10^{17}$ particles per cc.

5. A thermionic emitter structure, said structure comprising uranium carbide diluted with zirconium carbide, said carbides being solidified from a liquid solution.

6. The structure of claim 5 in which said carbides are coated on a refractory metal.

7. A device as in claim 4 wherein only a portion of said core contains $U^{235}$ thereby insuring a thermal gradient.

8. A nuclear reactor comprising a core, means for converting fission heat generated in said core to electricity within said core, said means including a plurality of thermionic fuel elements, each of said fuel elements including a fissionable cathode, an anode spaced from said cathode, and an ionizable gas between said cathode and anode.

9. A nuclear reactor comprising a core, a neutron moderator in said core; means for converting fission heat generated in said core to electricity within said core, said means including a plurality of thermionic fuel elements, said fuel elements including a fissionable cathode, an anode, and an ionizable gas between said cathode and anode; and means for maintaining a temperature gradient between said cathode and said anode.

10. A nuclear reactor comprising a core; means for converting fission heat generated in said core to electricity within said core, said means including a plurality of thermionic fuel elements, each of said fuel elements including a fissionable-material-containing cathode, an anode spaced from the cathode, and an ionizable gas in said space; means including an electrical conductive fluid for cooling said fuel elements; means for electrically insulating said cathode and anode from said coolant; and means for removing fission gases produced by said cathode from said core.

11. A nuclear reactor comprising a core; means for converting fission heat generated in said core to electricity within said core, said means including a plurality of fuel elements having a plurality of diodes, each of said diodes having a fissionable-material-containing cathode and an anode, said fissionable materal being in sufficient quantity in said core to sustain a chain reaction, said diodes being series connected; means for passing an ionizable gas through said diodes for removing fission gases released from said cathodes and for neutralizing space charge in said diodes; and means for passing a heat transfer medium in heat-removing relationship with said anodes.

12. A nuclear reactor comprising a core; means for converting fission heat generated in said core to electricity within said core, said means including a plurality of fuel elements having a plurality of diodes, each of said diodes having a fissionable-material-containing cathode and a spaced anode; means for series connecting said diodes, said means including support means for said cathodes; and means for removing fission gases released in said fuel elements and for neutralizing space charge in said diodes.

13. A thermionic fuel element comprising in combination a plurality of diodes each having a fissionable-material-containing cathode and an anode associated with each cathode and spaced therefrom; means for series connecting said diodes; and an ionizable gas in said cathode-anode spacing.

14. The thermionic fuel element of claim 13 wherein said ionizable gas is sealed within said fuel element.

15. The thermionic fuel element of claim 13 including means for passing said ionizable gas through said fuel element.

16. A thermionic fuel element comprising in combination at least one fissionable-material-containing cathode, an anode spaced from said cathode, means for removing heat from said anode, an ionizable gas in said space; and means including said gas for removing fission product gases released by said cathode.

17. A thermionic fuel element comprising in combination a plurality of fissionable-material-containing cathodes electrically insulated from each other, an anode associated with each cathode and spaced therefrom, each cathode and associated anode constituting a diode; means for series connecting said diodes; means for maintaining said anode at a temperature lower than said cathode whereby electrons liberated at said cathode move along a thermal gradient to the associated anode; an ionizable gas in said cathode-anode spacing; and means for removing fission gases released from said cathodes.

18. The thermionic fuel elements of claim 17 including means for supporting each of said cathodes in spaced relationship with the adjacent cathode and its associated anode, said means including an electrical connection between said cathode and the anode of the adjacent diode.

19. A thermionic fuel element comprising in combination a plurality of diodes having a cathode and anode, each of said cathodes containing fissionable material; insulating means between the cathodes of each of said diodes and between the anodes of each of said diodes; means for supporting said cathode of each of said diodes including an electrical connection to the anode of the adjacent diode; and an ionizable gas between the cathode and the anode of each of said diodes.

20. The combination of claim 19 in which said insulating means includes a perforated insulator disk.

21. The combination of claim 19 including electrical insulation enclosing said fuel element and a sealed container enclosing said electrical insulation.

22. A thermionic fuel element comprising in combination a plurality of fissionable-material-containing cathodes, an anode spaced from and associated with each of said cathodes; means for series connecting said plurality of cathodes and anodes, said means supporting said cathodes in spaced relationship; and an ionizable gas in said cathode-anode spacing.

23. A thermionic fuel element comprising a container, electrical insulation on the inside surface of said container, a plurality of anodes supported in spaced relation adjacent said insulation, a plurality of insulating disks between said anodes and dividing the volume of said container into a plurality of compartments, a fissionable-material-containing cathode supported in each of said compartments in spaced relation from said anode, an ionizible gas between each of said cathodes and its associated anode, and means for series connecting said plurality of cathodes and anodes.

24. A nuclear reactor comprising a core; means for directly converting heat liberated in said core to electricity including a plurality of thermionic fuel elements, each of said fuel elements containing at least one fissionable-material-containing ctahode, an anode and an ionizable gas, at least one group of said thermionic fuel elements series connected; and load means connected to said at least one group.

25. A nuclear reactor comprising a core, means for directly converting a portion of the heat liberated in said core to electricity including a plurality of thermionic fuel elements containing at least one fissionable-material-containing cathode, an anode, and an ionizable gas; electrical means interconnecting said fuel elements with a load; means for maintaining said anode at a temperature lower than said cathode, said last-named means including a coolant passing through said core; and means exterior to said core for converting a portion of the heat collected by said coolant in said core to electricity.

26. A thermoelectric converter comprising an anode, means for cooling the anode, a cathode spaced therefrom, an easily ionized gas between the anode and cathode, means for ionizing said gas to form a plasma comprising a source of fission fragments disposed adjacent said gas and means for establishing a field of neutron flux through said source to cause fissioning of said source.

27. A device for converting nuclear energy to electrical energy comprising a thermoelectric cell having a cathode containing a fissile material, the total fissile material within said device constituting a critical mass to sustain a chain nuclear fission reaction, a conductive anode in spaced relationship with and electrically insulated from said cathode, a gas between said anode and said cathode ionizable by fission fragments from said cathode, means for cooling said anode, and means for taking off the E.M.F. generated between said anode and said cathode.

28. In a nuclear reactor device containing a critical mass of fissile material to sustain a chain nuclear reaction, a thermoelectric cell comprising a cathode containing a fissile material, the fissile material of said cathode forming a part of the critical mass within the reactor device, an electrically conductive anode in spaced relationship with and electrically insulated from said cathode, a gas between said anode and said cathode ionizable by fission fragments from said cathode, means for cooling said anode, and means for taking off the E.M.F. generated between said anode and said cathode.

29. A thermionic emitter comprising uranium carbide and zirconium carbide, said carbides being in approximately the ratio of 80 atomic percent ZrC and 20 atomic percent UC.

30. The thermionic emitter of claim 29 wherein the carbides are in the form of a solid solution.

31. A thermionic fuel element for a nuclear reactor, said fuel element including a fissionable cathode, an anode spaced from said cathode, and an ionizable gas between said cathode and anode.

32. A thermionic fuel element for a nuclear reactor, said fuel element including a fissionable cathode, an anode, and an ionizable gas between said cathode and anode; and means for maintaining a temperature gradient between said cathode and said anode.

33. A thermionic fuel element for a nuclear reactor, said fuel element including a fissionable-material-containing cathode, an anode spaced from the cathode, and an ionizable gas in said space; means including an electrically conductive fluid for cooling said fuel elements; means for electrically insulating said cathode and anode from said coolant; and means for removing fission gases produced by said cathode from said core.

34. A thermionic fuel element for a nuclear reactor, said fuel element having a plurality of diodes, each of said diodes having a fissionable-material-containing cathode and an anode, said fissionable material being in sufficient quantity in said core to sustain a chain reaction, said diodes being series connected; means for passing an ionizable gas through said diodes for removing fission gases released from said cathodes and for neutralizing space charge in said diodes; and means for passing a heat transfer medium in heat-removing relationship with said anodes.

35. A thermionic fuel element for a nuclear reactor, said fuel element having a plurality of diodes, each of said diodes having a fissionable-material-containing cathode and a spaced anode; means for series connecting said diodes, said means including support means for said cathodes; and means for removing fission gases released in said fuel elements and for neutralizing space charge in said diodes.

36. A thermionic fuel element for a nuclear reactor comprising a cathode containing a fissile material, a conductive anode in spaced relationship with and electrically insulated from said cathode, a gas between said anode and said cathode ionizable by fission fragments from said cathode, means for cooling said anode, and means for taking off the E.M.F. generated between said anode and said cathode.

37. A thermionic fuel element for a nuclear reactor comprising a cathode containing a fissile material, a conductive anode in spaced relationship with and electrically insulated from said cathode, means for circulating between said anode and said cathode a gas ionizable by fission fragments from said cathode, and means for taking off the E.M.F. generated between said anode and said cathode.

38. A thermionic fuel element for a nuclear reactor comprising a cathode containing a fissile material, and electrically conductive anode in spaced relationship with and electrically insulated from said cathode, a gas between said anode and said cathode ionizable by fission fragments from said cathode, means for cooling said anode, and means for taking off the E.M.F. generated between said anode and said cathode.

References Cited by the Examiner

UNITED STATES PATENTS

| | | | |
|---|---|---|---|
| 2,661,431 | 12/1953 | Linder | 310—4 X |
| 2,980,819 | 4/1961 | Feaster | 313—212 |
| 3,005,766 | 10/1961 | Bartnoff | 176—39 |
| 3,008,890 | 11/1961 | Bartnoff | 176—39 |
| 3,041,260 | 6/1962 | Goeddel | 176—89 X |
| 3,087,877 | 4/1963 | Goeddel | 176—89 X |
| 3,093,567 | 6/1963 | Jablonski et al. | 176—52 |
| 3,113,091 | 12/1963 | Rasor et al. | 176—30 |

REUBEN EPSTEIN, *Primary Examiner*.

CARL D. QUARFORTH, *Examiner*.